(12) United States Patent
Carlson (10) Patent No.: US 11,924,584 B2
(45) Date of Patent: *Mar. 5, 2024

(54) HIGHWAY INFRASTRUCTURE INVENTORY AND ASSESSMENT DEVICE

(71) Applicant: Ennis-Flint, Inc., Greensboro, NC (US)

(72) Inventor: Paul J. Carlson, Greensboro, NC (US)

(73) Assignee: Ennis-Flint, Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,195

(22) Filed: May 10, 2021

(65) Prior Publication Data

US 2021/0409651 A1    Dec. 30, 2021

Related U.S. Application Data

(63) Continuation of application No. 15/636,597, filed on Jun. 28, 2017, now Pat. No. 11,006,082.

(Continued)

(51) Int. Cl.
*H04N 7/00* (2011.01)
*G06V 10/00* (2022.01)
(Continued)

(52) U.S. Cl.
CPC .............. *H04N 7/183* (2013.01); *G06V 10/95* (2022.01); *G06V 20/56* (2022.01); *H04N 7/181* (2013.01); *G01S 19/13* (2013.01); *G06Q 50/30* (2013.01)

(58) Field of Classification Search
CPC .... H04N 7/181; H04N 7/183; G06K 9/00979; G06K 9/00791; G06Q 50/30; G01S 19/13
See application file for complete search history.

(56) References Cited

U.S. PATENT DOCUMENTS

| | | |
|---|---|---|
| 11,006,082 B2 | 5/2021 | Carlson |
| 2007/0038338 A1* | 2/2007 | Larschan ............... G08G 1/205 701/2 |

(Continued)

OTHER PUBLICATIONS

U.S. Appl. No. 15/636,597, Final Office Action, dated Feb. 22, 2019, 15 pages.

(Continued)

*Primary Examiner* — Zhihan Zhou
(74) *Attorney, Agent, or Firm* — Kilpatrick Townsend & Stockton LLP (57) ABSTRACT

The disclosure provides a method for identifying a transportation infrastructure condition may comprise disposing a smart camera system on a vehicle and installing the smart camera system to the vehicle. The method may further comprise recording data from transportation infrastructure with the smart camera system, transmitting the data to a remote server with the transmitter, analyzing the data on the server, and accessing the data on the server with device. A system for identifying a transportation infrastructure condition may comprise a smart camera system disposed on a vehicle, wherein the smart camera system comprises a camera and transmitter, as well as a server capable to analyze data. A device may be configured to record and collect transportation infrastructure conditions. The camera system may comprise a camera, an electronic control module, a global positioning system, a single board computer, and a dashboard.

21 Claims, 7 Drawing Sheets

Related U.S. Application Data (60) Provisional application No. 62/355,444, filed on Jun. 28, 2016.

(51) Int. Cl.
  *G06V 10/94* (2022.01)
  *G06V 20/56* (2022.01)
  *H04N 7/18* (2006.01)
  *G01S 19/13* (2010.01)
  *G06Q 50/30* (2012.01)

(56) References Cited

U.S. PATENT DOCUMENTS

| | | | | |
|---|---|---|---|---|
| 2007/0041614 A1* | 2/2007 | Tanji | | G06V 10/255 |
| | | | | 382/104 |
| 2007/0132608 A1* | 6/2007 | Votaw | | G08G 1/161 |
| | | | | 340/903 |
| 2008/0082347 A1* | 4/2008 | Villalobos | | G07C 5/008 |
| | | | | 705/305 |
| 2008/0184785 A1* | 8/2008 | Wee | | G01B 11/306 |
| | | | | 73/104 |
| 2009/0021385 A1* | 1/2009 | Kelty | | B60L 58/13 |
| | | | | 340/660 |
| 2010/0001883 A1* | 1/2010 | Koenig | | B62D 15/029 |
| | | | | 340/988 |
| 2011/0094840 A1* | 4/2011 | Sakita | | B60L 53/12 |
| | | | | 701/119 |
| 2012/0194679 A1* | 8/2012 | Nehowig | | G07C 7/00 |
| | | | | 348/148 |
| 2013/0316737 A1* | 11/2013 | Guba | | G08G 1/20 |
| | | | | 455/456.4 |
| 2014/0334689 A1* | 11/2014 | Butler | | G06T 7/254 |
| | | | | 382/108 |
| 2016/0048810 A1* | 2/2016 | Shimada | | G06Q 10/06 |
| | | | | 702/34 |
| 2016/0093216 A1* | 3/2016 | Lee | | B60R 25/10 |
| | | | | 340/870.11 |
| 2016/0117923 A1* | 4/2016 | Dannenbring | | G06F 18/214 |
| | | | | 340/905 |
| 2016/0247335 A1* | 8/2016 | Daily | | G07C 5/0841 |
| 2017/0213084 A1* | 7/2017 | Akselrod | | G06V 20/588 |
| 2017/0351263 A1* | 12/2017 | Lambermont | | H04N 7/18 |

OTHER PUBLICATIONS

U.S. Appl. No. 15/636,597, Non-Final Office Action, dated Jun. 25, 2020, 13 pages.
U.S. Appl. No. 15/636,597, Notice of Allowance, dated Jan. 13, 2021, 11 pages.

* cited by examiner

HIGHWAY INFRASTRUCTURE INVENTORY AND ASSESSMENT DEVICE

CROSS-REFERENCE TO RELATED APPLICATIONS

This application is a continuation of U.S. patent application Ser. No. 15/636,597, filed Jun. 28, 2017, which claims the benefit of U.S. Application Ser. No. 62/355,444, filed Jun. 28, 2016, the entirety of all of which is hereby incorporated herein by reference.

STATEMENT REGARDING FEDERALLY SPONSORED RESEARCH OR DEVELOPMENT

This invention was made with government support under 468690 awarded by the Texas Department of Transportation. The government has certain rights in the disclosure.

BACKGROUND OF THE DISCLOSURE

Field of the Disclosure

The present disclosure may generally relate to adapting an available after-market machine system built for assisted driving, and more specifically, to creating an on-board markings assessment network. Embodiments of the present disclosure may be installed in vehicles to inventory and assess the condition of transportation infrastructure, such as, for example, signs and pavement markings, and then may transmit data to a remote server (e.g., cloud-based). Analytics may be performed on the data and the results may be provided back to the user with "dashboards" that may be available on mobile devices or on computers equipped with a connection to the internet. Additionally, embodiments of the present disclosure may be installed on fleet vehicles to generate fleet sourced data. As the vehicles go about their daily duties, they may collect data which may analyze transportation data.

Background of the Disclosure

Agencies may rely on various methods to inventory and assess transportation infrastructure. For example, for pavement markings, there may generally be two methods used to assess the condition of the pavement markings. One method may be a visual method which may involve a dedicated nighttime trip. Alternatively, agencies may hire a service provider to measure the condition of the markings using specialized equipment that may be expensive and limited to retro reflectivity assessments (daytime visibility may not be considered). This process may be time consuming and may only provide a snapshot of the condition of the markings (usually once per year). The disclosure described herein, may remove the subjectivity of visual inspections, may not require dedicated trips, may provide more frequent results, and may be used to assess both daytime and nighttime performance. These benefits may provide more agencies and other users with much more robust data to make more cost-effective decisions with limited resources.

BRIEF SUMMARY OF SOME OF THE PREFERRED EMBODIMENTS

These and other needs in the art are addressed in one embodiment by a method, a system, and a device for identifying a transportation infrastructure condition. The method may comprise disposing a smart camera system on a vehicle and installing the smart camera system to the vehicle. The smart camera system may comprise a smart camera, a single board computer (SBC), an electric control module (ECM), a global positioning system (GPS), and a transmitter. The method may further comprise recording data from a transportation infrastructure with the smart camera system, transmitting the data to a remote server with the transmitter, analyzing the data on the server, and accessing the data on the server with a device, wherein the device displays the data on a dashboard.

A system for identifying a transportation infrastructure condition may comprise a smart camera system disposed on a vehicle, wherein the smart camera system comprises a camera and a transmitter, as well as a server capable to analyze data.

A camera system configured to record and collect transportation infrastructure condition. The camper system may comprise a camera, an electronic control module, a global positioning system, a single board computer, and a dashboard.

The foregoing has outlined rather broadly the features and technical advantages of the present disclosure in order that the detailed description of the disclosure that follows may be better understood. Additional features and advantages of the disclosure will be described hereinafter that form the subject of the claims of the disclosure. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

For a detailed description of the preferred embodiments of the disclosure, reference will now be made to the accompanying drawings in which.

DETAILED DESCRIPTION OF THE PREFERRED EMBODIMENTS

The present embodiments relate to the use of an available after-market machine vision system built for assisted driving which may be adapted with additional equipment to provide benefits for the highway owner-operator. Aftermarket systems may be sold or provided to transportation infrastructure owner/operators/maintainers. Subscriptions to the service (analytics and output) may be used to generate profit.

Adapting an available after-market device built for assisted driving may be installed in vehicles to inventory and assess the condition of pavement markings, which may transmit the data to an off-site server. Analytics may be performed and the results may be provided back to a user in easy to use "dashboards" that may be accessible by a mobile device, tablet and/or traditional computers equipped with a connection to the internet. In embodiments, OEM ("Original Equipment Manufacturer") and after-market devices and sensors may be installed in vehicles to assist drivers and improve safety. Also, vehicles may be equipped with sensors and devices to perform specific tests and assessments for the inventory and maintenance condition of assets in the transportation of infrastructure. This disclosure may encompass a process to integrate safety devices, especially camera, lidar and other sensors, for a secondary benefit to inventory and assess the Road Right of Way ("ROW") maintenance. This disclosure primarily may assess pavement markings but also may include other transportation infrastructure assets captured by video, lidar and other sensors. Captured data may then be processed and then presented to users for efficient action and time and money savings for carrying out ROW inventory and maintenance.

This disclosure may cover several elements. Data may be captured via sensors and devices which may be designed for primarily safety applications. The ROW infrastructure and specific condition of the particular assets of interest may be evaluated based on the image with the result reported for maintenance planning. This may save users from having to dedicate specific vehicles to drive roads to acquire this data as a separate process. The data may be integrated with other data and information obtained via the Controlling Area Network bus ("CAN bus") and other sensors, either in a device/appliance or at a server. The data may be converted to information based on analytics and parameters so that the information may be ultimately presented to users for cost effective and directed action, thereby improving asset management with this timely information.

This disclosure may include the application and analytics and processing necessary to assess condition of ROW assets, such as pavement markings, without requiring dedicated vehicles. This disclosure may also implement a network effect whereby many vehicles may provide data from a number of devices rather than vehicles specifically equipped for a specific task. The benefit may be vehicle-sourced continuous data acquisition over time with updates to the condition data further improving maintenance performance and cost efficiency.

This disclosure may be applicable to assessing the condition of road markings and signage, which may be seen via an aftermarket camera installed for safety. Without limitation, this disclosure may also include other items captured by the camera and other sensors, integrating other data from the CAN bus or otherwise, to better assess maintenance condition or changes to other ROW assets.

Figure 1:
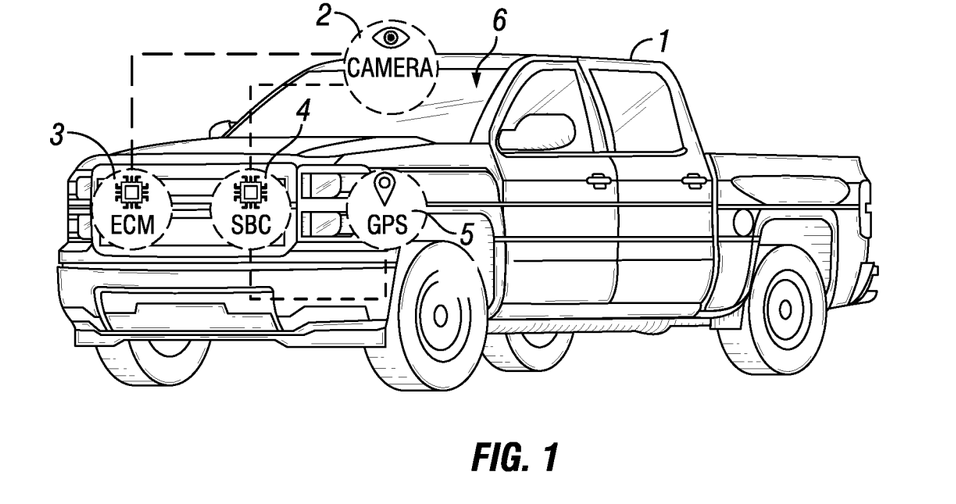
FIG. 1 is a schematic illustration of a smart camera system installed on a vehicle in accordance with embodiments of the present disclosure.

FIG. 1 illustrates a smart camera system 6 disposed in vehicle 1. Smart camera system 6 is disposed in vehicle 1 anywhere one skilled in the art would deem suitable for the smart camera system 6 to view and assess transportation infrastructure. Smart camera system 6 may include a smart camera 2, an electronic control module (ECM) 3, a single board computer (SBC) 4, a Global Positioning System (GPS) 5 and a transmitter (not pictured). Vehicle 1 may also be equipped with sensors (not pictured). These sensors are either factory sensors and/or installed after vehicle 1 was purchased. These sensors may include, but are not limited to, humidity sensors, temperature sensors, proximity sensors, optical sensors, position sensors, environment sensors, ultrasonic sensor, passive infrared sensor, distance sensor, hall effect sensor, variable reluctance sensor, speed sensors, and the like. The SBC 4 may operate as a motherboard, where data may be stored and may further be configured to allow smart camera system 6 to communicate with sensors, such as but not limited to, humidity sensors, temperature sensors, proximity sensors, optical sensors, position sensors, environment sensors, ultrasonic sensor, passive infrared sensor, distance sensor, hall effect sensor, variable reluctance sensor, speed sensors, and/or the like. The ECM 3 is an embedded system that controls one or more of the electrical systems or subsystems in a transport vehicle. Both SBC 4 and ECM 3 may be disposed anywhere in the vehicle one skilled in the art would deem suitable. The data collected by smart camera system 6 and the sensors may be transmitted to a server 41. A transmitter (not illustrated) may communicate with server 41, discussed below, wirelessly through a computer and/or a cellular network. In examples, the transmitter may directly connect with a computer network. Data from smart camera system 6 may be transmitted in real time to server 41.

Figure 2:
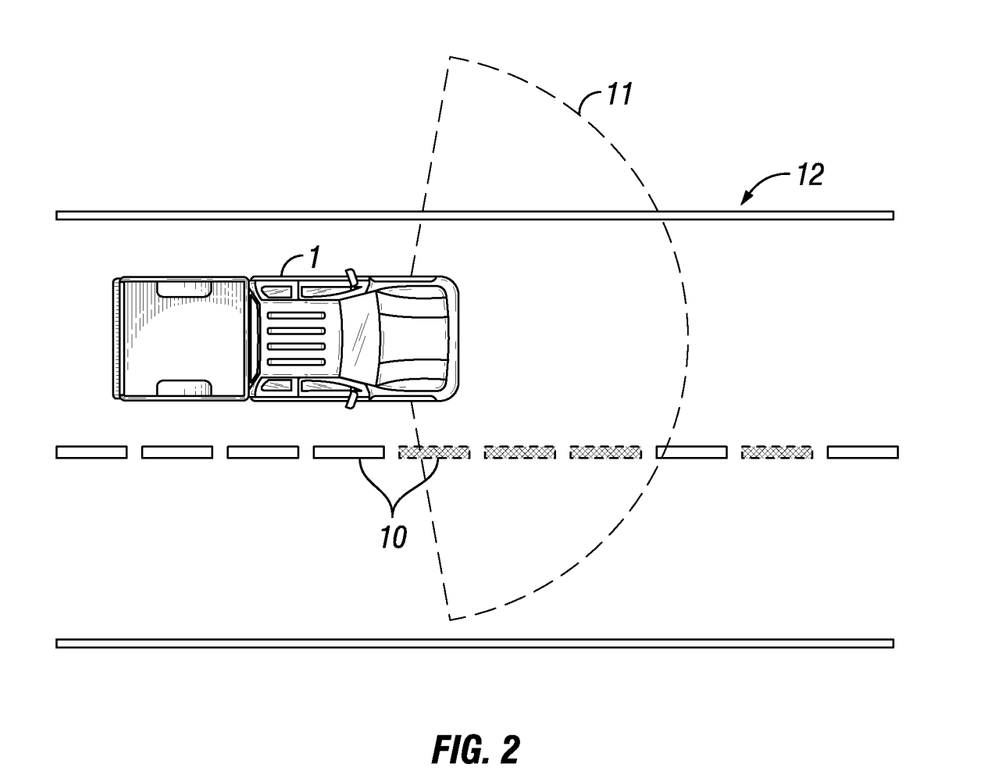
FIG. 2 is a schematic illustration of data being collected at its point of origin m accordance with embodiments of the present disclosure.

FIG. 2 illustrates data being collected at its point of origin. A vehicle 1 that may be equipped with smart camera system 6 and sensors may collect and record data of transportation infrastructure 12. In a non-limiting example, FIG. 2 illustrates vehicle 1 traveling along transportation infrastructure 12. Smart camera system 6 and sensors may utilize many different methods for collecting data. Such techniques may include, but are not limited to video, lidar, and other sensors. As illustrated in FIG. 2 using Lidar, smart camera system 6 may illuminate the transportation infrastructure 12 with a pulsed laser light 11. Pulsed laser light 11 is reflected back and may be measured using a sensor. These measurements may then determine the visibility of transportation infrastructure 12 such as, but not limited to pavement markings 10, identification signs, traffic conditions, and/or the like. This information may be transmitted in real time to server 41 where the information may be compiled and analyzed.

Figure 3:
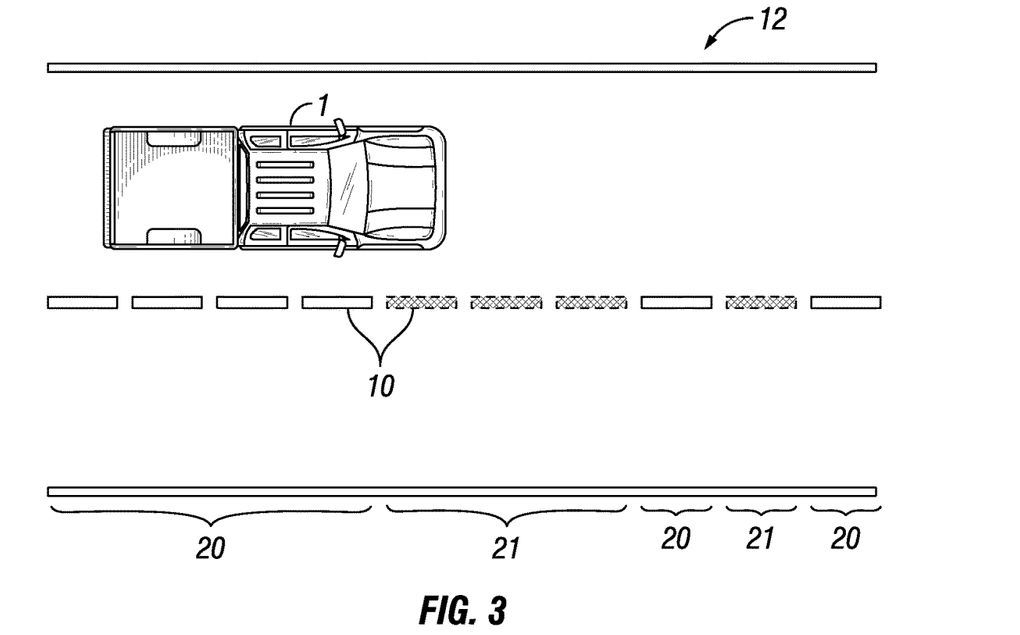
FIG. 3 is a schematic illustration of a camera that may rate the condition of the pavement markings in accordance with embodiments of the present disclosure.

As illustrated in FIG. 3, the transportation infrastructure 12 may then be categorized into sections based on measurements from smart camera system 6. For example, vehicle 1 may be travelling within a transportation infrastructure 12 recording and collecting data. These recordings may identify at least one part of transportation infrastructure 12 as good sections 20 and as bad sections 21. For example, good sections 20 may be defined as visible pavement markings and bad sections 21 may be defined as faint or obscure pavement markings. This is one example of the types of data that may be collected from transportation infrastructure 12. With respect to FIG. 2, other types of data collected pertaining to transportation infrastructure 12 may include, but is not limited to, the infrastructure integrity, visibility of pavement markings 10, signs, weather conditions, traffic conditions, estimated repair costs, daily travel, speed limit, traffic incidents. Weather conditions may further include, temperature, relative humidity, forecast and the like.

Figure 4:
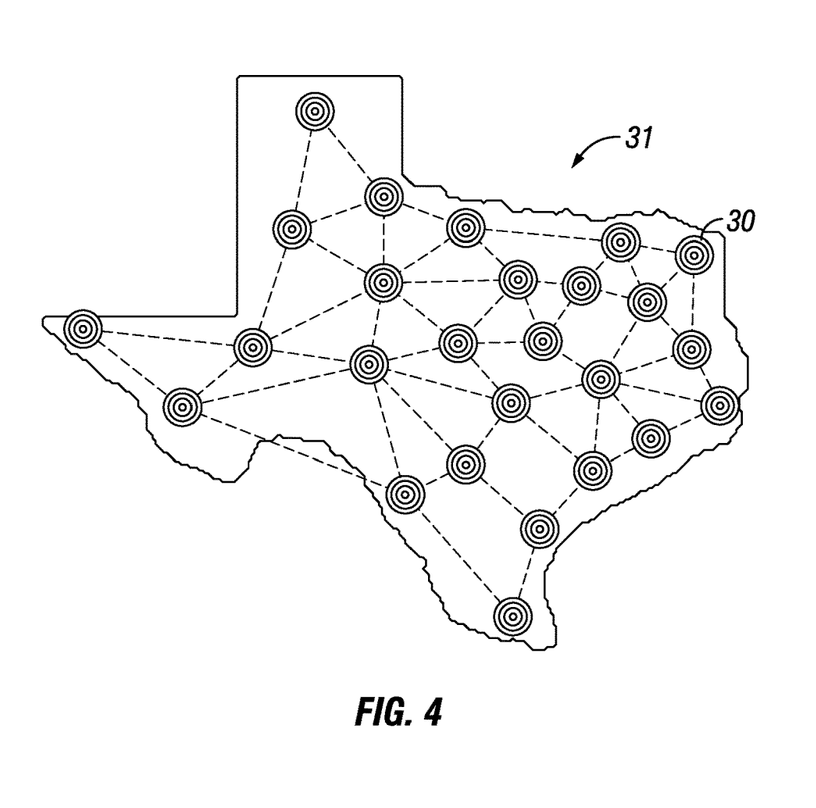
FIG. 4 is a schematic illustration of a data collecting network m accordance with embodiments of the present disclosure.

FIG. 4 illustrates that a fleet of vehicles 1 (reference to FIG. 1), which may be disposed within sectors 30 may generate data over a geographical area 31, which may provide a breakdown of transportation infrastructure 12. Within geographical area 31, the information gathered by the fleet is collected, transmitted to a remote server and/or servers 41 (refer to FIG. 5), compiled, analyzed, and then processed. The data is then displayed on a dashboard 60, as discussed below. Dashboard 60 may be displayed on any device 47, discussed below, capable of accessing server 41. Non-limiting examples of devices 42 which may be capable of accessing server 41 are smart phones, tablets and/or traditional computers.

Figure 5:
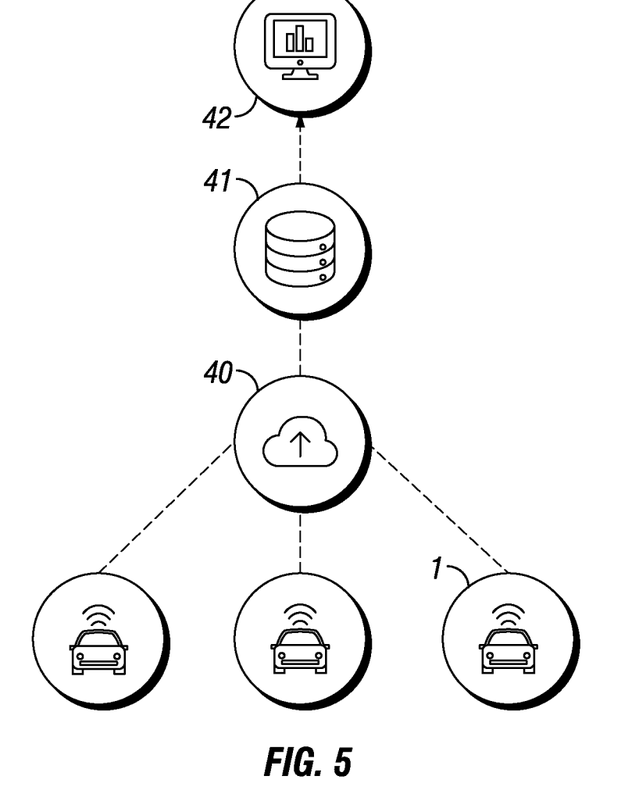
FIG. 5 is a schematic illustration of data which may disclose conditions of the roads in accordance with embodiments of the present disclosure.

FIG. 5 illustrates that data from a plurality of vehicles 1 may send recorded data to HUB 40 which may communicated the recorded data to server 41. Server 41 may analyze and process the data which may be accessed by device 42 which may display conditions of transportation infrastructure 12. Device 42 may produce web based products. The information may be transmitted wirelessly through a computer network, wirelessly through a cellular network or through a direct connection with a computer network. The configured data is then accessible either directly at the server 41 or offsite by device 42 that communicates wirelessly with the server 41 or the data is accessible off site by device 42 that is directly connected to the server 41 through a computer network. The information collected by a plurality of vehicles 1 concerning a geographical region may be sent to a third party. This third party may then use this information as desired. In a non-limiting embodiment, the third party may be a government entity. The government entity may use the collected data to make road improvement and repair decisions. Furthermore, the geographical region may include, but is not limited to, a road, a county, a district, a state, a country, and or any combination thereof.

Figure 6:
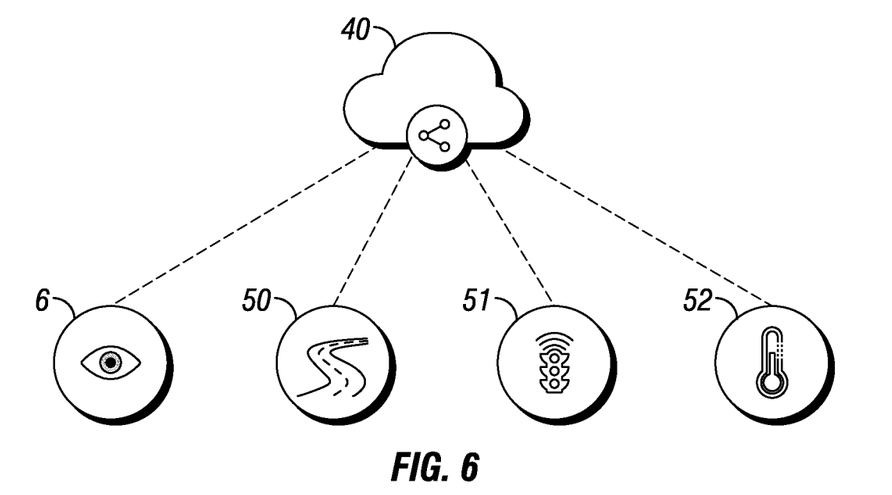
FIG. 6 is a schematic illustration of additional information m accordance with embodiments of the present disclosure.

FIG. 6 illustrates additional information collected by smart camera system 6 that may be disclosed by web based products. With reference to FIG. 5, this information is included in the information that is collected by the vehicles 1 and transmitted to a server and/or servers 41. The additional information may include smart camera systems 6 in vehicles 1, conditions of transportation infrastructure 50, transportation planning and programming traffic counts 51, and weather 52. Conditions of transportation infrastructure may include traffic information, pavement markings, transportation infrastructure signs, and the like. Transportation planning and programming traffic counts include information about traffic such as, but not limited to, when and where traffic normally occurs. Weather includes information including, but not limited to, the dew point, the temperature, the relative humidity, and or the like.

Figure 7:
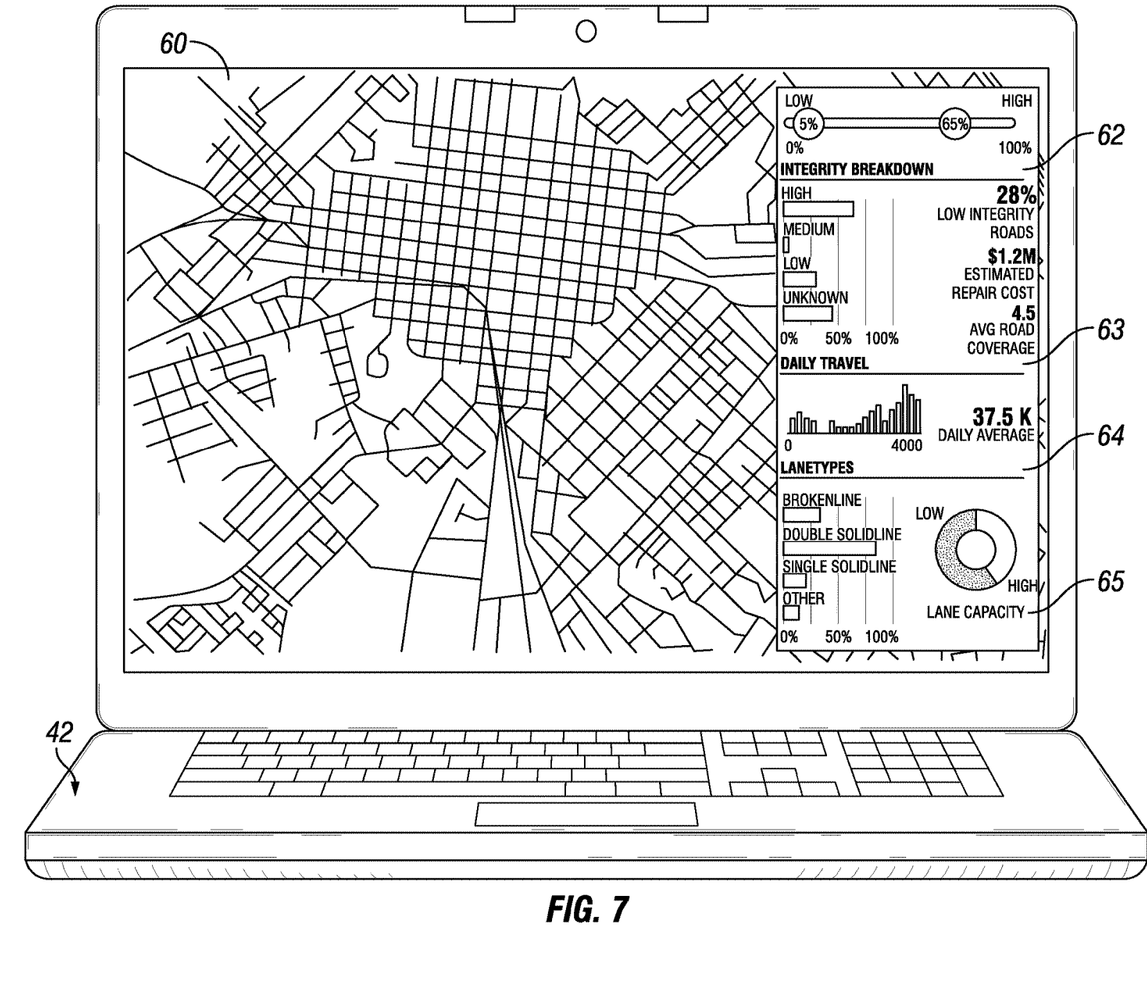
FIG. 7 is a schematic illustration of a dashboard in accordance with embodiments of the present disclosure.

FIG. 7 illustrates a high level view of the dashboard 60. This view of dashboard 60 may include information such as, but not limited to, integrity breakdown 62, daily travel 63, lane types 64, and/or lane capacity 65. The integrity breakdown 62 may further include, but is not limited to, the percentage of low integrity roads, estimated cost of repair, and/or average road coverage. Daily travel 63 may include information such as, but not limited to, the amount of transportation vehicles that may traverse at least a portion of transportation infrastructure. Lane types 64 may be further broken down into categories including, but not limited to, broken line, double solid line, single solid line, and/or other.

It should be noted that dashboard 60 may be configured to display integrity breakdown 62, daily travel 63, lane types 64, and/or lane capacity 65 device 42 in any suitable configuration.

Figure 8:
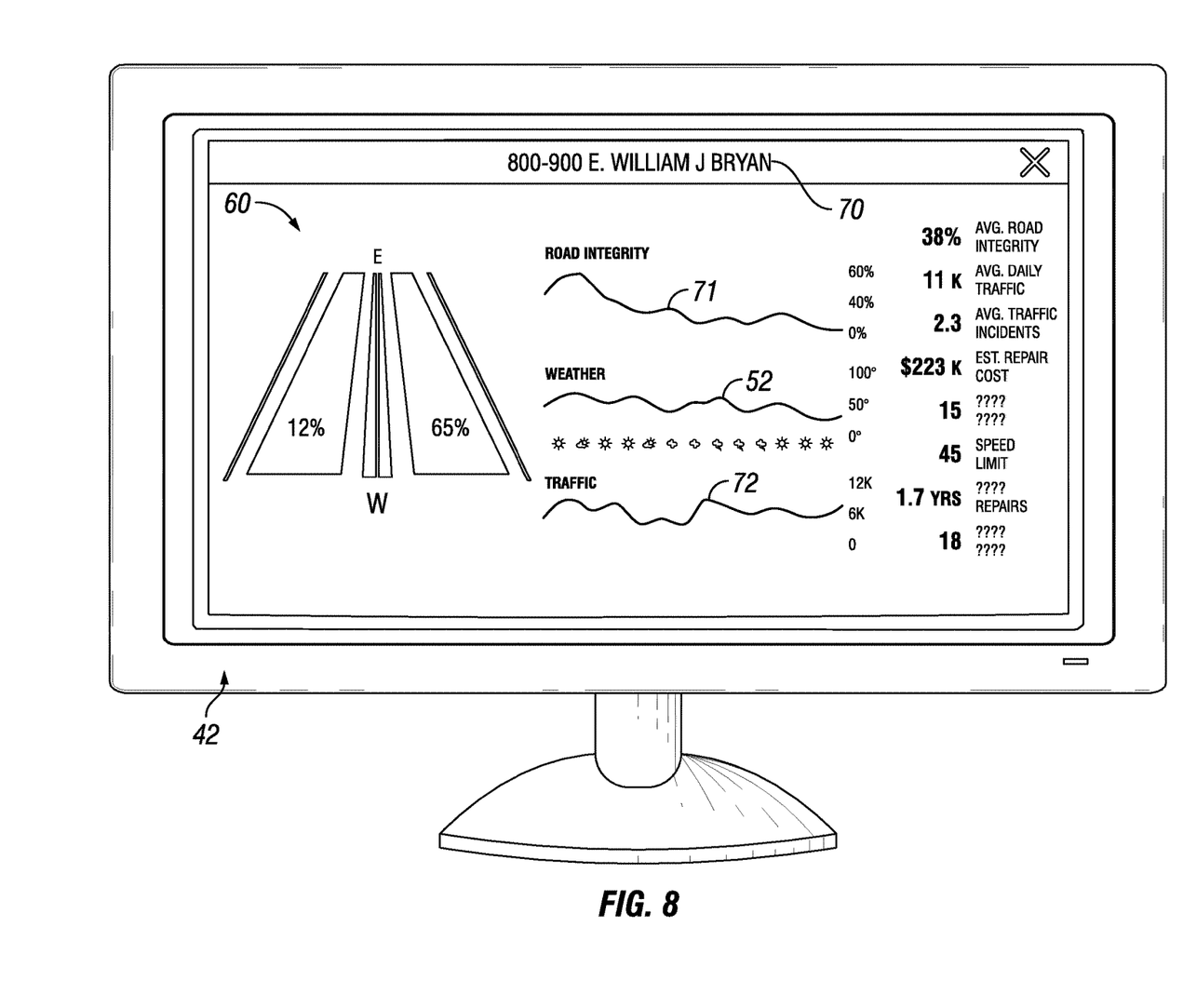
FIG. 8 is a schematic illustration of a dashboard showing location specific details in accordance with embodiments of the present disclosure.

FIG. 8 illustrates a dashboard 60 showing location specific details in accordance with embodiments of the present disclosure. Specific location may include, but is not limited to, a specific road. The information displayed may include, but is not limited to, the name of the road 70 being analyzed, the road integrity 71, the weather conditions 52 and traffic statistics 72. The road integrity 71 may include information such as pavement conditions and or visibility of pavement markings. The weather conditions 52 may include information such as relative humidity, temperature, and/or the projected forecast. Traffic statistics 72 include information such as times and places where traffic is frequent. Information displayed on the dashboard 60 may further comprise the average road integrity, average daily traffic, average traffic incidents, estimated repair costs, customer complaints, speed limit, and time since last repair. It should be noted that dashboard 60 may be displayed on device 42 in any suitable configuration.

Figure 9:
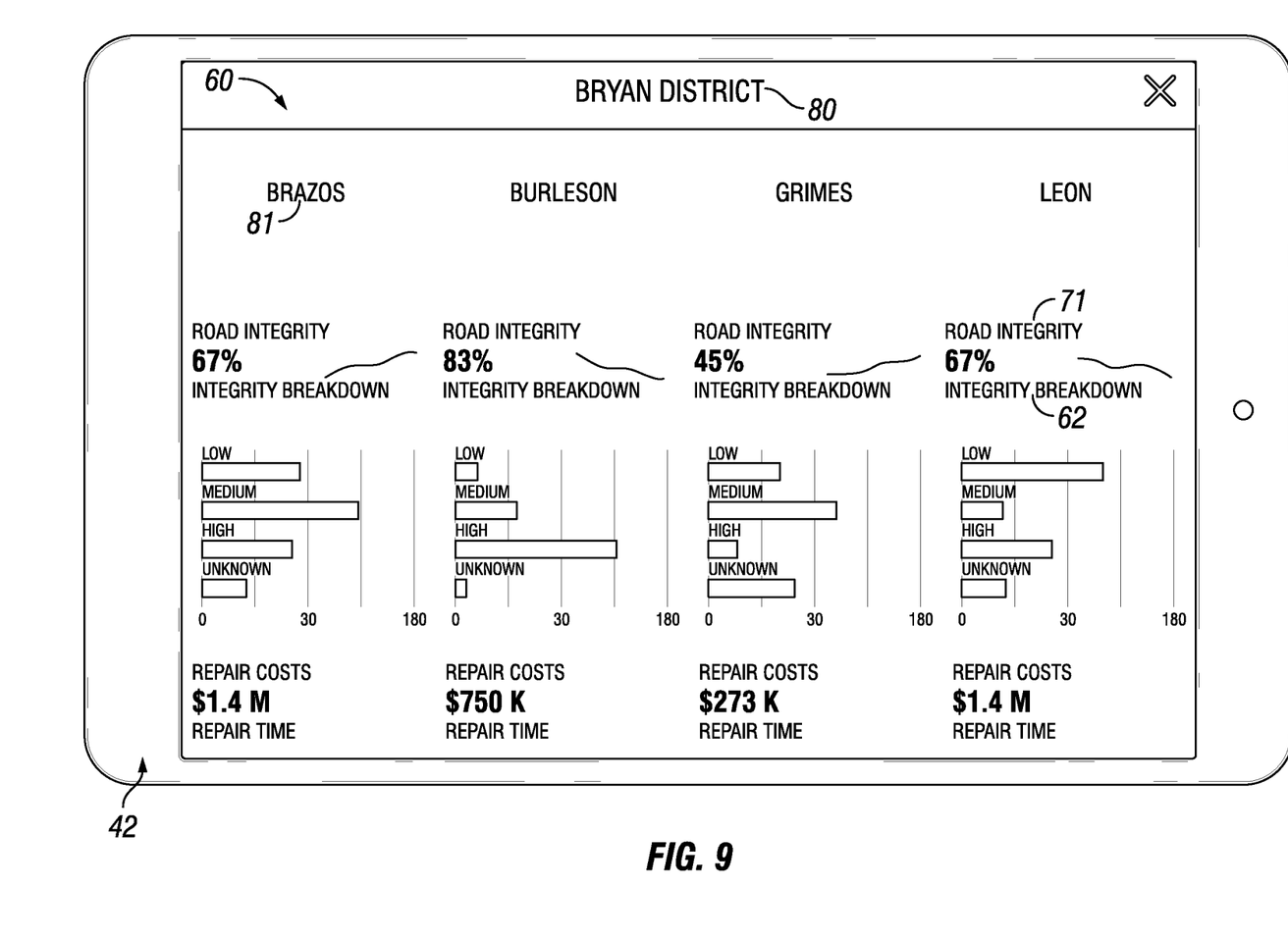
FIG. 9 is a schematic illustration of a dashboard showing At-a-Glance Reporting in accordance with embodiments of the present disclosure.

FIG. 9 illustrates a dashboard 60 showing At-a-Glance Reporting in accordance with embodiments of the present disclosure. Dashboard 60 displays information pertaining to a district 80 broken up by counties 81. Information displayed on dashboard 60 may include, but is not limited to, road integrity 71 and integrity breakdown 62. The road integrity 71 may include information such as pavement conditions and or visibility of pavement markings. Integrity breakdown 62 may break down the roads traveled according to their integrity ranking, such as good, moderate, bad, and/or other. Information displayed on dashboard 60 may further comprise, but is not limited to, repair costs and repair time. It should be noted that dashboard 60 may be displayed on device 42 in any suitable configuration.

Figure 10:
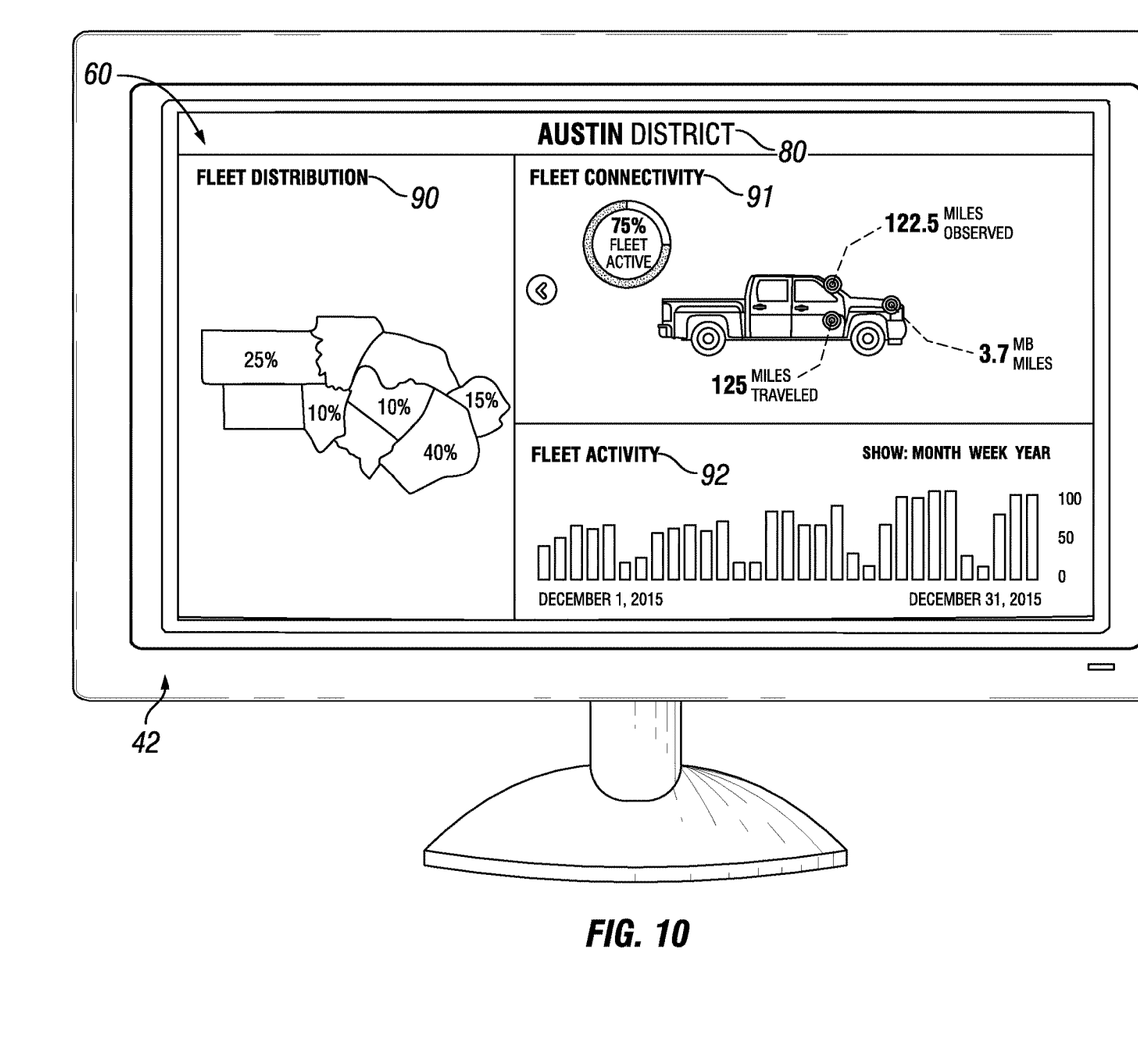
FIG. 10 is a schematic illustration of a dashboard showing Fleet Analytics in accordance with embodiments of the present disclosure.

FIG. 10 illustrates a dashboard 60 showing Fleet Analytics in accordance with embodiments of the present disclosure. This dashboard 60 may display information pertaining to fleet activity 92 over district 80. This dashboard 60 may display information including, but not limited to, fleet connectivity 91, fleet distribution 90 and fleet activity 92. Fleet connectivity 91 may be further broken down into categories including, but not limited to, miles traveled, miles observed, and/or the percentage of the fleet that was active over district 80. Fleet distribution 90 shows where the fleet traveled and how often. Fleet activity 92 shows how long the plurality of vehicles 1 were active in said geographical area 31. It should be noted that dashboard 60 may be displayed on device 42 in any suitable configuration.

It should be understood that the present disclosure uses the term "sensor" or "sensors" to mean any number of different types of sensors found on a vehicle. It should be noted that these types of sensors may include, but are not limited to humidity sensors, temperature sensors, proximity sensors, optical sensors, position sensors, environment sensors, ultrasonic sensor, passive infrared sensor, distance sensor, hall effect sensor, variable reluctance sensor, speed sensors and the like.

Although the present disclosure and its advantages have been described in detail, it should be understood that various changes, substitutions and alterations may be made herein without departing from the spirit and scope of the disclosure as defined by the appended claims.

What is claimed is:

1. A system comprising:
   a processor that is remote from a group of vehicles; and
   a memory including instructions executable by the processor for causing the processor to perform operations including:
   receiving data collected from the group of vehicles about multiple roads in a geographical area, the group of vehicles including smart camera systems configured for collecting the data;
   determining, based on the data, road integrities associated with the multiple roads in the geographical area;
   determining, based on the data, lane types associated with the multiple roads in the geographical area; and
   generating a user interface that includes a dashboard, the dashboard concurrently indicating the road integrities and the lane types associated with the multiple roads.

2. The system of claim 1, wherein determining the road integrities associated with the multiple roads comprises determining that a first road of the multiple roads has a first integrity level and that a second road of the multiple roads has a second integrity level, the second integrity level being different from the first integrity level.

3. The system of claim 1, wherein determining the lane types associated with the multiple roads comprises determining that a first road of the multiple roads has a first lane type and that a second road of the multiple roads has a second lane type, the second lane type being different from the first lane type.

4. The system of claim 1, wherein the data includes images of pavement markings on the multiple roads, and wherein determining the road integrities associated with the multiple roads involves analyzing the images of the pavement markings.

5. The system of claim 1, wherein the data includes images of pavement markings on the multiple roads, and wherein determining the lane types associated with the roads involves analyzing the images of the pavement markings on the multiple roads.

6. The system of claim 1, wherein the operations further comprise:
   determining an estimated repair cost associated with the multiple roads based on the road integrities; and
   generating the user interface to include the estimated repair cost.

7. The system of claim 1, wherein the user interface includes a first interface page and a second interface page, the first interface page being a higher-level dashboard indicating the road integrities and the lane types associated with the multiple roads, and the second interface page being a lower-level dashboard indicating a structural integrity and an estimated repair cost related to a particular road.

8. The system of claim 7, wherein the second interface page further indicates weather conditions and traffic statistics related to the particular road.

9. The system of claim 1, wherein the user interface further indicates lane capacity and average road coverage associated with the multiple roads.

10. The system of claim 1, wherein the user interface includes a first visualization of a first distribution of the road integrities, and wherein the user interface includes a second visualization of a second distribution of the lane types.

11. The system of claim 1, wherein the lane types are different categories of lanes including broken line, double solid line, and single solid line.

12. A method comprising:
    receiving, by a server, data collected from a group of vehicles about multiple roads in a geographical area, the group of vehicles including smart camera systems configured for collecting the data, wherein the server is remote from the group of vehicles;
    determining, by the server and based on the data, road integrities associated with the multiple roads in the geographical area;
    determining, by the server and based on the data, lane types associated with the multiple roads in the geographical area; and
    generating, by the server, a user interface that includes a dashboard, the dashboard concurrently indicating the road integrities and the lane types associated with the multiple roads.

13. The method of claim 12, wherein determining the road integrities associated with the multiple roads comprises determining that a first road of the multiple roads has a first integrity level and that a second road of the multiple roads has a second integrity level, the second integrity level being different from the first integrity level.

14. The method of claim 12, wherein determining the lane types associated with the multiple roads comprises determining that a first road of the multiple roads has a first lane type and that a second road of the multiple roads has a second lane type, the second lane type being different from the first lane type.

15. The method of claim 12, wherein determining the road integrities involves receiving the road integrities as part of the data collected from the group of vehicles.

16. The method of claim 12, wherein determining the lane types involves receiving the lane types as part of the data collected from the group of vehicles.

17. The method of claim 12, further comprising:
    determining an estimated repair cost associated with the multiple roads based on the road integrities; and
    generating the user interface to include the estimated repair cost.

18. The method of claim 12, wherein the user interface includes a first interface page and a second interface page, the first interface page indicating the road integrities and the lane types associated with the multiple roads, and the second interface page indicating a structural integrity and an estimated repair cost related to a particular road.

19. The method of claim 18, wherein the second interface page further indicates weather conditions and traffic statistics related to the particular road.

20. The method of claim 12, wherein the user interface further indicates lane capacity and average road coverage associated with the multiple roads.

21. A non-transitory computer-readable medium comprising program code that is executable by a processor for causing the processor to perform operations including:
    receiving data collected from a group of vehicles about multiple roads in a geographical area, the group of vehicles including smart camera systems configured for collecting the data, wherein the processor is remote from the group of vehicles;
    determining, based on the data, road integrities associated with the multiple roads in the geographical area;
    determining, based on the data, lane types associated with the multiple roads in the geographical area; and
    generating a user interface that includes a dashboard, the dashboard concurrently indicating the road integrities and the lane types associated with the multiple roads.

* * * * *